(12) United States Patent
Schmidt et al.

(10) Patent No.: US 9,699,463 B2
(45) Date of Patent: Jul. 4, 2017

(54) CONSTANT QUALITY VIDEO ENCODING (71) Applicant: INTEL CORPORATION, Santa Clara, CA (US)

(72) Inventors: Johannes P. Schmidt, Los Altos Hills, CA (US); James A. Baldwin, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 251 days.

(21) Appl. No.: 13/727,529

(22) Filed: Dec. 26, 2012

(65) Prior Publication Data
US 2014/0177702 A1 Jun. 26, 2014

(51) Int. Cl.
H04N 19/154 (2014.01)
H04N 19/12 (2014.01)
H04N 19/172 (2014.01)

(52) U.S. Cl.
CPC .......... *H04N 19/154* (2014.11); *H04N 19/12* (2014.11); *H04N 19/172* (2014.11)

(58) Field of Classification Search
CPC ..... H04N 19/12; H04N 19/154; H04N 19/172
See application file for complete search history.

(56) References Cited

U.S. PATENT DOCUMENTS

| 7,818,444 B2 * | 10/2010 | Brueck | H04L 29/06027 709/231 |
| 2008/0260042 A1 * | 10/2008 | Shah | H04N 19/197 375/240.25 |
| 2010/0189183 A1 * | 7/2010 | Gu | H04N 21/23439 375/240.28 |

(Continued)

FOREIGN PATENT DOCUMENTS

WO WO 2012-103332 A2 8/2012

OTHER PUBLICATIONS

International Search Report and Written Opinion mailed Jul. 17, 2014 for International Application No. PCT/US2013/072263, 14 pages.
International Preliminary Report on Patentability mailed Jul. 9, 2015, issued in corresponding International Application No. PCT/US2013/072263, 10 pages.

*Primary Examiner* — Thai Tran
*Assistant Examiner* — Christopher T Braniff
(74) *Attorney, Agent, or Firm* — Schwabe, Williamson & Wyatt, P.C.

(57) ABSTRACT

In embodiments, apparatuses, methods and storage media are described that are associated with content distribution. In embodiments, an encoder may be configured to encode portions of content, such as video and/or audio data, utilizing different sets of encoding control variable settings. The different sets of encoding control variable settings may include different resolutions, different frame rates, and/or different compression levels. In embodiments, different segments and/or different portions of a single segment of data may be encoded using different sets of encoding control variable settings. In embodiments, the sets of encoding control variable settings may be selected based on quality of the encoded video and/or audio data. Instances of video and/or audio data encoded with different sets may be compared to the data from which they were generated to determine one or more quality metrics. One of the instances may then be selected for provisioning to a content consumption device.

39 Claims, 6 Drawing Sheets

(56) References Cited

U.S. PATENT DOCUMENTS

2010/0272173 A1    10/2010   Puri et al.
2011/0173013 A1     7/2011   Dieterich et al.
2011/0305273 A1    12/2011   He et al.

* cited by examiner

CONSTANT QUALITY VIDEO ENCODING

TECHNICAL FIELD

The present disclosure relates to the field of data processing, in particular, to apparatuses, methods and storage media associated with video encoding.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Advances in computing, networking and related technologies have led to proliferation in the availability of multi-media content, and the manners in which the content is consumed. Today, multi-media content may be made available from fixed medium (e.g., Digital Versatile Disk (DVD)), broadcast, cable operators, satellite channels, Internet, and so forth. Users may consume content with a television set, a laptop or desktop computer, a tablet, a smartphone, or other devices of the like. Further, content may be made available in various formats and bitrates in order to support the capabilities of the various consumption technologies that are available to consumers.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Apparatuses, methods and storage medium associated with content distribution and/or consumption are disclosed herein. In embodiments, an encoder may be configured to encode portions of content, such as audio and/or video data, utilizing different sets of encoding control variable settings and to select some of these encoded portions for provisioning, such as to a content consumption device. The selection of encoded portions of content for provisioning may be based on the content of the video and/or audio data. For example, two portions of data may be provided at a particular bitrate for presentation by a content consumption device. In various embodiments, the two portions of video and/or audio data may be encoded using different sets of encoding control variable settings while having substantially similar bitrates. The different sets of encoding control variable settings may include different resolutions, different frame rates, and/or different compression levels. In various embodiments, the portions of video and/or audio may be provided with reference to video and/or audio segments that are created as separate units of encoded video and/or audio data for provisioning, such as to a content consumption device. Thus, different segments and/or different portions of a single segment of data may be encoded using different sets of encoding control variable settings.

In various embodiments, the encoded portions of video and/or audio data may be selected based on bitrate of the encoded video and/or audio data. In various embodiments, the encoded portions may be selected based on their bitrates as compared to a pre-selected set of content bitrates to be provided, such as to content consumption devices. In Various embodiments, the encoded portions of video and/or audio data may be selected based on quality of the encoded video and/or audio data. For example, two or more portions may be encoded using different sets of encoding control variable settings. These instances of encoded video and/or audio data may then be compared to the video and/or audio data from which they were generated to determine one or more quality metrics. One of the instances may then be selected for provisioning to a content consumption device based at least in part on these quality metrics.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
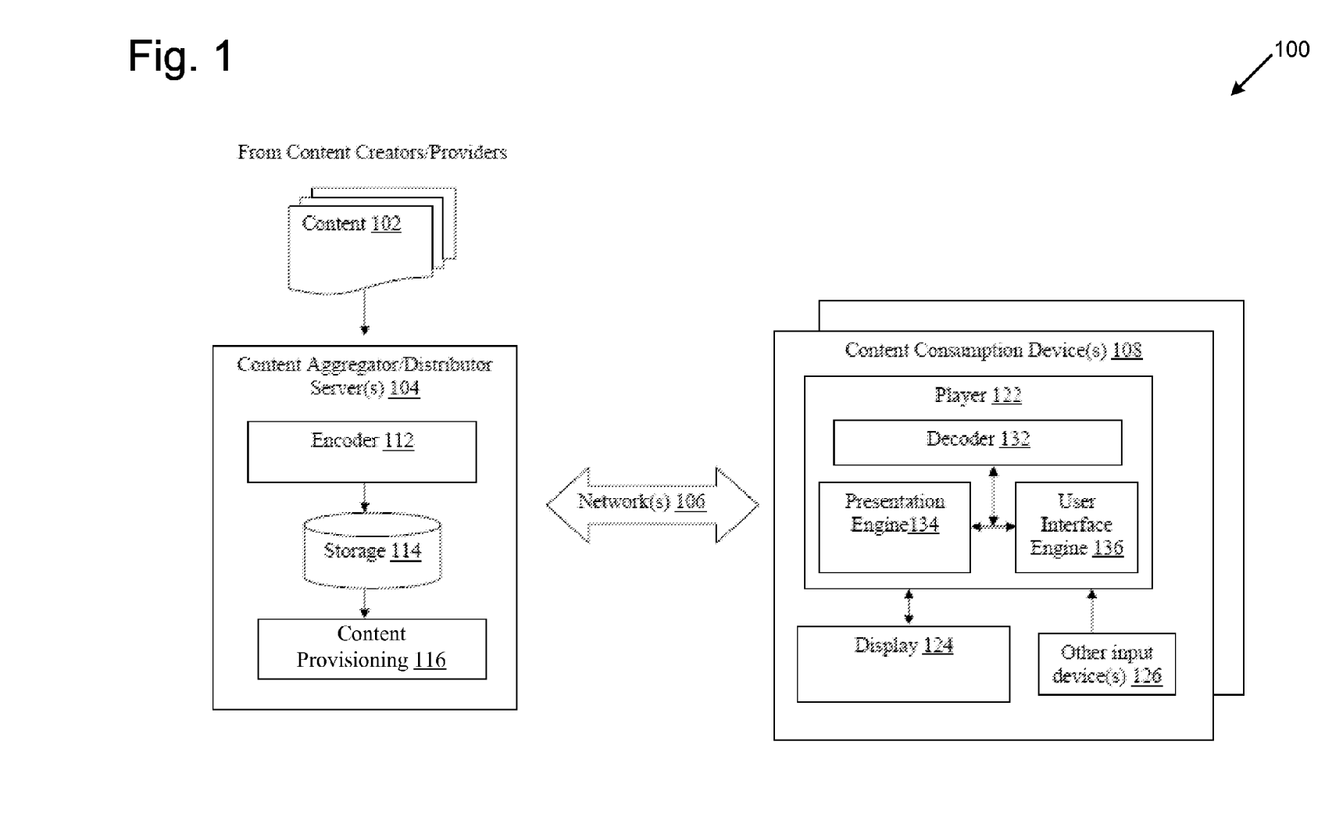
FIG. 1 illustrates an arrangement for content distribution and consumption, in accordance with various embodiments.

Referring now to FIG. 1, an arrangement for content distribution and consumption, in accordance with various embodiments, is illustrated. As shown, in embodiments, arrangement 100 for distribution and consumption of content may include a number of content consumption devices 108 coupled with one or more content aggregation/distribution servers 104 via one or more networks 106. Content aggregation/distribution servers 104 may be configured to aggregate and distribute content to content consumption devices 108 for consumption, via one or more networks 106. As will be described in more detail below, content aggregation/distribution servers 104 may be incorporated with various teachings of the present disclosure to transcode content 102 for presentation by content consumption devices 108.

In embodiments, as shown, content aggregation/distribution servers 104 may include encoder 112, storage 114 and content provisioning 116, which may be coupled to each other as shown. Encoder 112 may be configured to encode content 102 from various content providers, and storage 114 may be configured to store encoded content. Content provisioning 116 may be configured to selectively retrieve and provide encoded content to the various content consumption devices 108 in response to requests from the various content consumption devices 108. Content 102 may be multi-media content of various types, having video, audio, and/or closed captions, from a variety of content creators and/or providers. Examples of content may include, but are not limited to, movies, TV programming, user created content (such as YouTube video, iReporter video), music albums/titles/pieces, and so forth. Examples of content creators and/or providers may include, but are not limited to, movie studios/distributors, television programmers, television broadcasters, satellite programming broadcasters, cable operators, online users, and so forth.

In embodiments, for efficiency of operation, encoder 112 may be configured to encode the various content 102, typically in different encoding formats, into a subset of one or more common encoding formats. However, encoder 112 may be configured to nonetheless maintain indices or cross-references to the corresponding content in their original encoding formats. Similarly, for flexibility of operation, encoder 112 may encode or otherwise process each or selected ones of content 102 into multiple versions of different quality levels. The different versions may provide different resolutions, different bitrates, and/or different frame rates for transmission and/or playing. In various embodiments, the encoder 112 may publish, or otherwise make available, information on the available different resolutions, different bitrates, and/or different frame rates. For example, the encoder 112 may bitrates at which it may provide video or audio content to the content consumption device(s) 108. Encoding of audio data may be performed in accordance with, e.g., but are not limited to, the MP3 standard, promulgated by the Moving Picture Experts Group (MPEG). Encoding of video data may be performed in accordance with, e.g., but are not limited to, the H264 standard, promulgated by the International Telecommunication Unit (ITU) Video Coding Experts Group (VCEG). Encoder 112 may include one or more computing devices configured to perform content portioning, encoding, and/or transcoding, such as described herein.

Storage 114 may be temporal and/or persistent storage of any type, including, but are note limited to, volatile and non-volatile memory, optical, magnetic and/or solid state mass storage, and so forth. Volatile memory may include, but are not limited to, static and/or dynamic random access memory. Non-volatile memory may include, but are not limited to, electrically erasable programmable read-only memory, phase change memory, resistive memory, and so forth.

Content provisioning 116 may, in various embodiments, be configured to provide encoded content as discrete files and/or as continuous streams of encoded content. Content provisioning 116 may be configured to transmit the encoded audio/video data (and closed captions, if provided) in accordance with any one of a number of streaming and/or transmission protocols. The streaming protocols may include, but are not limited to, the Real-Time Streaming Protocol (RTSP). Transmission protocols may include, but are not limited to, the transmission control protocol (TCP), user datagram protocol (UDP), and so forth. Networks 106 may be any combinations of private and/or public, wired and/or wireless, local and/or wide area networks. Private networks may include, e.g., but are not limited to, enterprise networks. Public networks, may include, e.g., but is not limited to the Internet. Wired networks, may include, e.g., but are not limited to, Ethernet networks. Wireless networks, may include, e.g., but are not limited to, Wi-Fi, or 3 G/4 G networks. It would be appreciated that at the content distribution end, networks 106 may include one or more local area networks with gateways and firewalls, through which servers 104 go through to communicate with content consumption devices 108. Similarly, at the content consumption end, networks 106 may include base stations and/or access points, through which consumption devices 108 communicate with servers 104. In between the two ends may be any number of network routers, switches and other networking equipment of the like. However, for ease of understanding, these gateways, firewalls, routers, switches, base stations, access points and the like are not shown.

In embodiments, as shown, a content consumption device 108 may include player 122, display 124 and user input device 126. Player 122 may be configured to receive streamed content, decode and recovered the content from the content stream, and present the recovered content on display 124, in response to user selections/inputs from user input device 126.

In embodiments, player 122 may include decoder 132, presentation engine 134 and user interface engine 136. Decoder 132 may be configured to receive streamed content, decode and recover the content from the content stream. Presentation engine 134 may be configured to present the recovered content on display 124, in response to user selections/inputs. In various embodiments, decoder 132 and/or presentation engine 134 may be configured to present audio and/or video content to a user that has been encoded using varying encoding control variable settings in a substantially seamless manner. Thus, in various embodiments, the decoder 132 and/or presentation engine 134 may be configured to present two portions of content that vary in resolution, frame rate, and/or compression settings without interrupting presentation of the content. User interface engine 136 may be configured to receive the user selections/inputs from a user.

While shown as part of a content consumption device 108, display 124 and/or user input device(s) 126 may be stand-alone devices or integrated, for different embodiments of content consumption devices 108. For example, for a television arrangement, display 124 may be a stand alone television set, Liquid Crystal Display (LCD); Plasma and the like, while player 122 may be part of a separate set-top set, and other user input device 126 may be a separate remote control or keyboard. Similarly, for a desktop computer arrangement, player 122, display 124 and other input device(s) 126 may all be separate stand atone units. On the other hand, for a tablet arrangement, display 124 may be a touch sensitive display screen that includes other user input device(s) 126, and player 122 may be a computing platform with a soft keyboard that also include one of the user input device(s) 126. Further, display 124 and player 122 may be integrated within a single form factor. Similarly, for a smartphone arrangement, player 122, display 124 and other input device(s) 126 my be likewise integrated.

Figure 2:
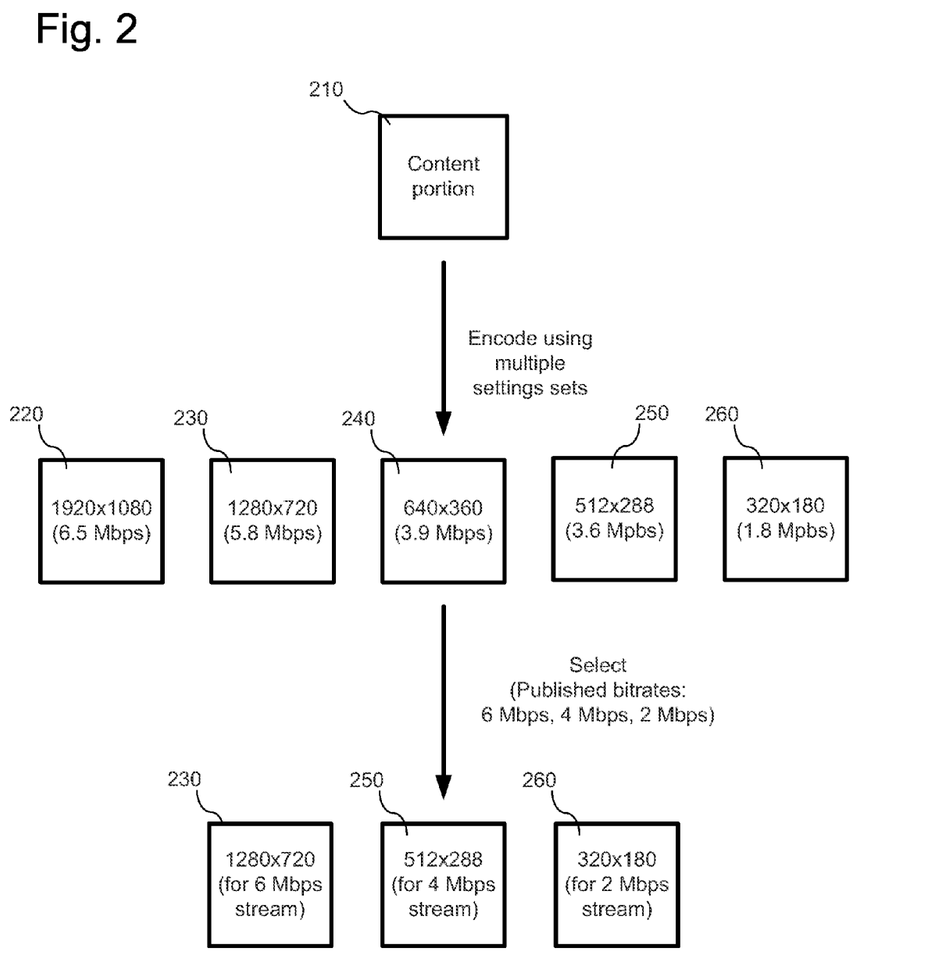
FIG. 2 illustrates examples of encoding and selecting portions of encoded video and/or audio data, in accordance with various embodiments.

FIG. 2 illustrates examples of encoding and selecting portions of encoded video and/or audio data, in accordance with various embodiments. As illustrated in FIG. 2, a content portion 210 may be received by the encoder 112 of the content aggregation/distribution server 104. In various embodiments, the content portion 210 may include a segment of video that has been divided from a larger piece of content, such as by the encoder 112 for provisioning, such as to the content consumption device(s) 108. In other embodiments, these segments may be divided and later provided by the content provisioning 116 as discrete units of content during streaming of content. In other embodiments, the content portion 210 may include more than one segment of content. In yet other embodiments, the content portion 210 may include less than a full segment. Thus a segment that is provided by content provisioning 116 may include more than one content portion that has been encoded and selected according to techniques described herein.

As illustrated, in various embodiments, the content portion 210 may be encoded from the format it was received in to generate encoded instances of the content portion, each encoded instance being encoded according to different sets of encoding control variable settings. Thus, as the example of FIG. 2 illustrates, the content portion 210 may be transcoded into an encoded instance 220, that has a resolution of 1920×1080, an encoded instance 230 that has a resolution of 1280×720, an encoded instance 240 that has a resolution of 640×480, and encoded instance 250 that has a resolution of 512×288, and an encoded instance 260 that has a resolution of 320×180. It may be recognized that, while particular examples of encoding control variable settings are given in FIG. 2, in other embodiments, different resolutions (or other encoding control variable settings, such as frame rate) may be used. Additionally, as illustrated in FIG. 2, each of the encoded instances of the content portion 210 has a different bitrate. Thus, for example, encoded instance 220 has a bitrate of 6.5 Mbps, while encoded instance 230 has a bitrate of 5.8 Mbps.

Additionally, as FIG. 2 illustrates, in various embodiments, one or more of the encoded instances of the content portion 210 may be selected for provisioning. In some embodiments, the selected instances may be selected based on their bitrate and/or on the quality of the encoded instances. Thus, in the example, encoded instances are selected based on bitrates of 6 Mbps, 4 Mbps, and 2 Mbps published for content consumption device(s) 108 by the content aggregation/distribution server 104. Using the examples given above, according to various embodiments, encoded instances 230, 250, and 260 may be chosen for provisioning in the 6 Mbps, 4 Mbps, and 2 Mbps streams, respectively. In various embodiments, the encoded instance that is selected may be the highest quality instance that is less than a given published bitrate for a stream. For example, as illustrated, in some embodiments, the encoded instance that is selected may be the highest-resolution encoded instance that is less than the given bitrate, as this highest-resolution instance may have the highest quality. In the example of FIG. 2, encoded instance 230, with a bitrate of 5.8 Mbps is illustrated as being chosen for the 6 Mbps stream. Similarly, encoded instance 260, with a bitrate of 1.8 Mbps, is illustrated as being chosen for the 2 Mbps stream. In other embodiments, the encoded instance selected may not be the highest-resolution encoded instance, but may still exhibit the highest quality of any instance with a bitrate under the given bitrate for a stream. In other embodiments, the encoded instance that is chosen may instead be based on other factors. For example, if two or more encoded instances have bitrates below a bitrate for a stream and a lower-resolution encoded instance out of the instances has a relatively high quality level, then the lower-resolution encoded instance may be chosen over one or more higher resolution encoded instances in order to provide additional savings in the stream. Thus, in the example of FIG. 2, encoded instance 250, which has a bitrate of 3.6 Mbps, has been chosen for the 4 Mbps stream over encoded instance 240, which has a bitrate of 3.9 Mbps. In various embodiments, and as described herein, this selection may be made based on quality metrics as compared to bitrate savings for the encoded instances.

Figure 3:
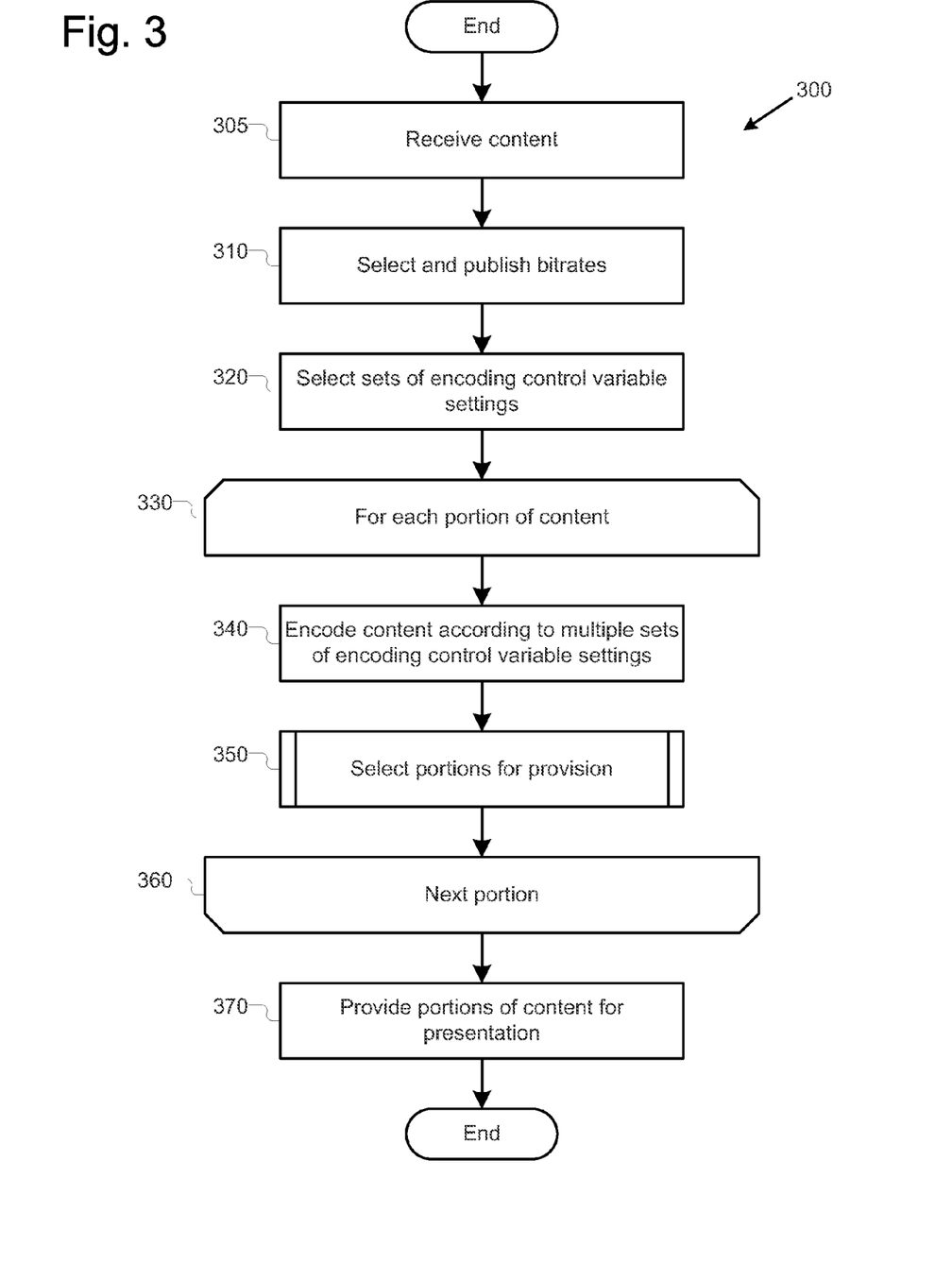
FIG. 3 illustrates an example process for providing encoded portions of encoded video and/or audio data, in accordance with various embodiments.

FIG. 3 illustrates an example process 300 for providing encoded portions of encoded video and/or audio data, in accordance with various embodiments. In various embodiments, process 300 may be performed by the encoder 112 in order to encode portion of the content 102 for provisioning by the content provisioning 116. While FIG. 3 illustrates a particular ordering an division of operations, in various embodiments, one or more operations of process 300 may be re-ordered, combined, divided further, or omitted.

The process may begin at operation 305, where the encoder 112 may receive the content 102. In various embodiments, the content may be received as streamed content, such as a multicast stream. In other embodiments, the content may be received as a discrete piece of content. In various embodiments, the content may include audio and/or video data. Next, at operation 310, the encoder may select and publish, such as to one or more content consumption device(s) 108, one or more bitrates for provisioning of content to the content consumption device(s) 108.

Next, at operation 320, the encoder 112 may select one or more sets of encoding control variable settings to use for encoding of portions of content. The sets of encoding control variable settings may, in various embodiments, include combinations of resolution, frame rate, and/or compression settings. In various embodiments, a set of encoding control variables may be selected in order to control the encoder 112 to substantially provide a desired bitrate, such as an average bitrate. In various embodiments, different sets of encoding control variables may be selected for a given bitrate and may differ in more than one encoding control variable setting in order to control the encoder 112 to substantially provide the same or similar bitrate as other sets of encoding control variables. Thus, for example, a first set of encoding control variables may include a resolution setting of 1280×720 and a given quantization level. A second set of encoding control variables may include a resolution setting of 960×480, but may have a lower quantization level (and/or other compression setting) that results in a similar bitrate. Thus, while the first set may include higher resolution video, it may feature higher levels of compression than the second set. Portions of video encoded with these sets may then be selected during encoding, such as based on their actual bitrate and/or relative quality.

Next, at operation 330, the encoder 112 may begin a loop for each portion of content that is being encoded. As discussed herein in various embodiments, the portions over which process 300 may loop may include one or more segments of provisioned content, and/or may include smaller portions that are less than a provisioned segment.

At operation 340, the encoder 112 may encode the portion of content according to the previously-selected sets of encoding control variable settings to create one or more encoded instances of the portion of content. Then at operation 350, the encoder 112 my select one or more of these encoded instances of the portion of content for provisioning. Examples of embodiments of operation 350 are described below with reference to process 400 of FIG. 4. Next, at loop operation 360, the loop may continue for a next portion of content. At operation 370, the encoder 112 and/or the content provisioning 116 may provide the encoded portions for presentation. The process may then end.

Figure 4:
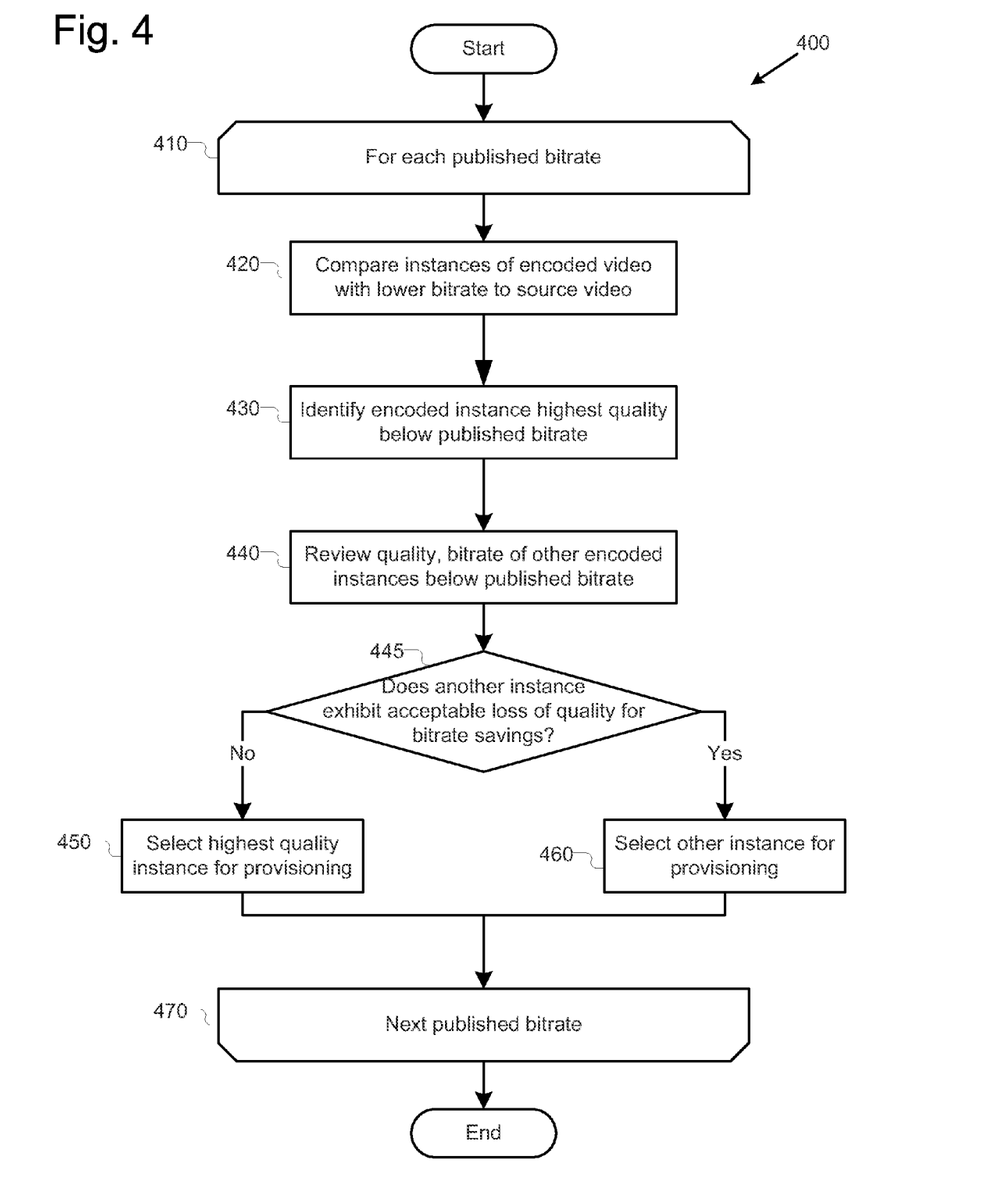
FIG. 4 illustrates an example process for selecting portions of encoded video and/or audio data for provision, in accordance with various embodiments.

FIG. 4 illustrates an example process 400 for selecting portions of encoded video and/or audio data for provision, in accordance with various embodiments. In various embodiments, process 400 may be performed by the encoder 112, in order to select encoded instances of a portion of content from multiple encoded instances that were encoded based on different sets of encoding control variable settings. While FIG. 4 illustrates a particular ordering an division of operations, in various embodiments, one or more operations of process 400 may be re-ordered, combined, divided further, or omitted. In various embodiments, process 400 may be performed with relation to each portion of content for which encoded instances were created during process 300.

The process may begin at loop operation 410, where the encoder 112 may begin a loop for each published bitrate that was selected during operation 310 of process 300. Next, at operation 420, the encoder 112 may compare one or more encoded instances of the portion of content that have a lower bitrate than the published bitrate, such as by comparing the instances to the received portion of content, to determine quality metrics for the instances. Thus, for example, the encoded instances may be compared to the received portion of video from which they are encoded and one or more differences may be determined. These differences may comprise quality metrics used to determine which encoded instance of the portion of video has a higher quality and should therefore be selected.

Next, at operation 430, the encoder 112 may identify, for the published bitrate, an encoded instance of the portion of content with a bitrate below the published bitrate that has the highest quality. Next, at operation 440, the encoder 112 may review quality metrics and bitrates for other encoded instances of the portion of content that have bitrates below the published bitrate.

Next, at decision operation 445, the encoder 112 may determine whether there is another encoded instance of the portion of content that exhibits an acceptable loss of quality in relation to its lower bitrate, such as compared to the bitrate of the encoded instance identified at operation 430. Thus, in some embodiments, the bitrate of the instances may be compared to the quality metrics that are generated during operation 420. If the encoder 112 determines that the loss of quality in the other encoded instances of the portion of content is too great, then at operation 450, the encoder 112 may select the previously-identified encoded instance of the portion of content with the highest quality for provisioning.

If, however, the encoder 112 determines that there is another encoded instance of the portion of content for which the loss of quality is acceptable, then at operation 460, the encoder 112 may select that encoded instance of the portion of content for provisioning. It may be recognized that, in various embodiments, no comparison between encoded instances may be made at all. After an instance has been selected, then at loop operation 470, the encoder 112 may continue the loop with the next published bitrate. Once the loop has been performed for each published bitrate, the process may then end.

Figure 5:
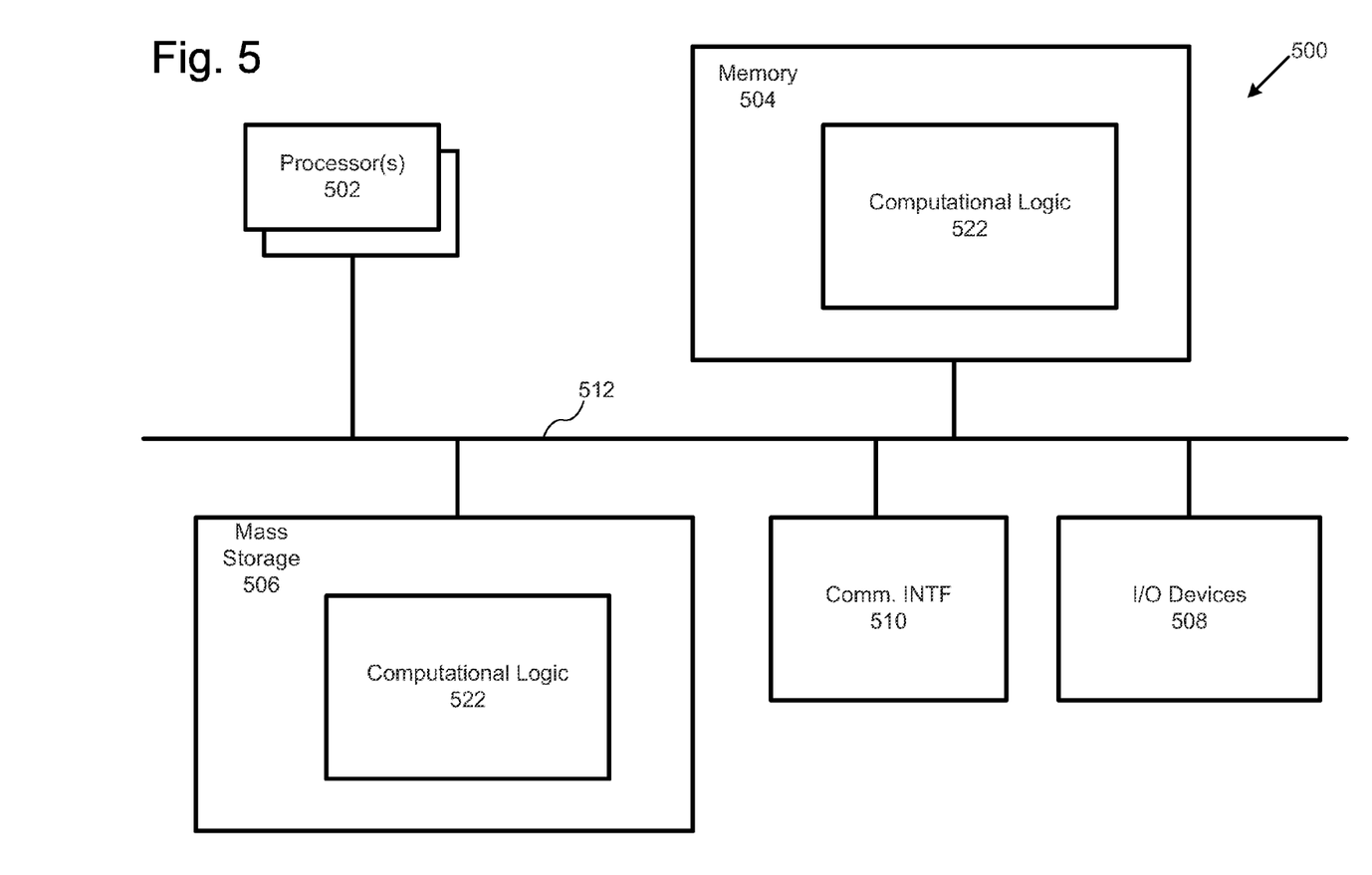
FIG. 5 illustrates an example computing environment suitable for practicing the disclosure, in accordance with various embodiments.

Referring now to FIG. 5, an example computer suitable for use for the arrangement of FIG. 1, in accordance with various embodiments, is illustrated. As shown, computer 500 may include one or more processors or processor cores 502, and system memory 504. For the purpose of this application, including the claims, the terms "processor" and "processor cores" may be considered synonymous, unless the context clearly requires otherwise. Additionally, computer 500 may include mass storage devices 506 (such as diskette, hard drive, compact disc read only memory (CD-ROM) and so forth), input/output devices 508 (such as display, keyboard, cursor control and so forth) and communication interfaces 510 (such as network interface cards, modems and so forth). The elements may be coupled to each other via system bus 512, which may represent one or more buses. In the case of multiple buses, they may be bridged by one or more bus bridges (not shown).

Each of these elements may perform its conventional functions known in the art. In particular, system memory 504 and mass storage devices 506 may be employed to store a working copy and a permanent copy of the programming instructions implementing the operations associated with content aggregation/distribution servers 104, e.g., the segmenting and/or encoding operations as earlier described. The various elements may be implemented by assembler instructions supported by processor(s) 502 or high-level languages, such as, for example, C, that can be compiled into such instructions.

The permanent copy of the programming instructions may be placed into permanent storage devices 506 in the factory, or in the field, through, for example, a distribution medium (not shown), such as a compact disc (CD), or through communication interface 510 (from a distribution server (not shown)). That is, one or more distribution media having an implementation of the agent program may be employed to distribute the agent and program various computing devices.

The number, capability and/or capacity of these elements 510-512 may vary, depending on whether computer 500 is used as a content aggregation/distribution server 104 or a content consumption device 508. Their constitutions are otherwise known, and accordingly will not be further described.

Figure 6:
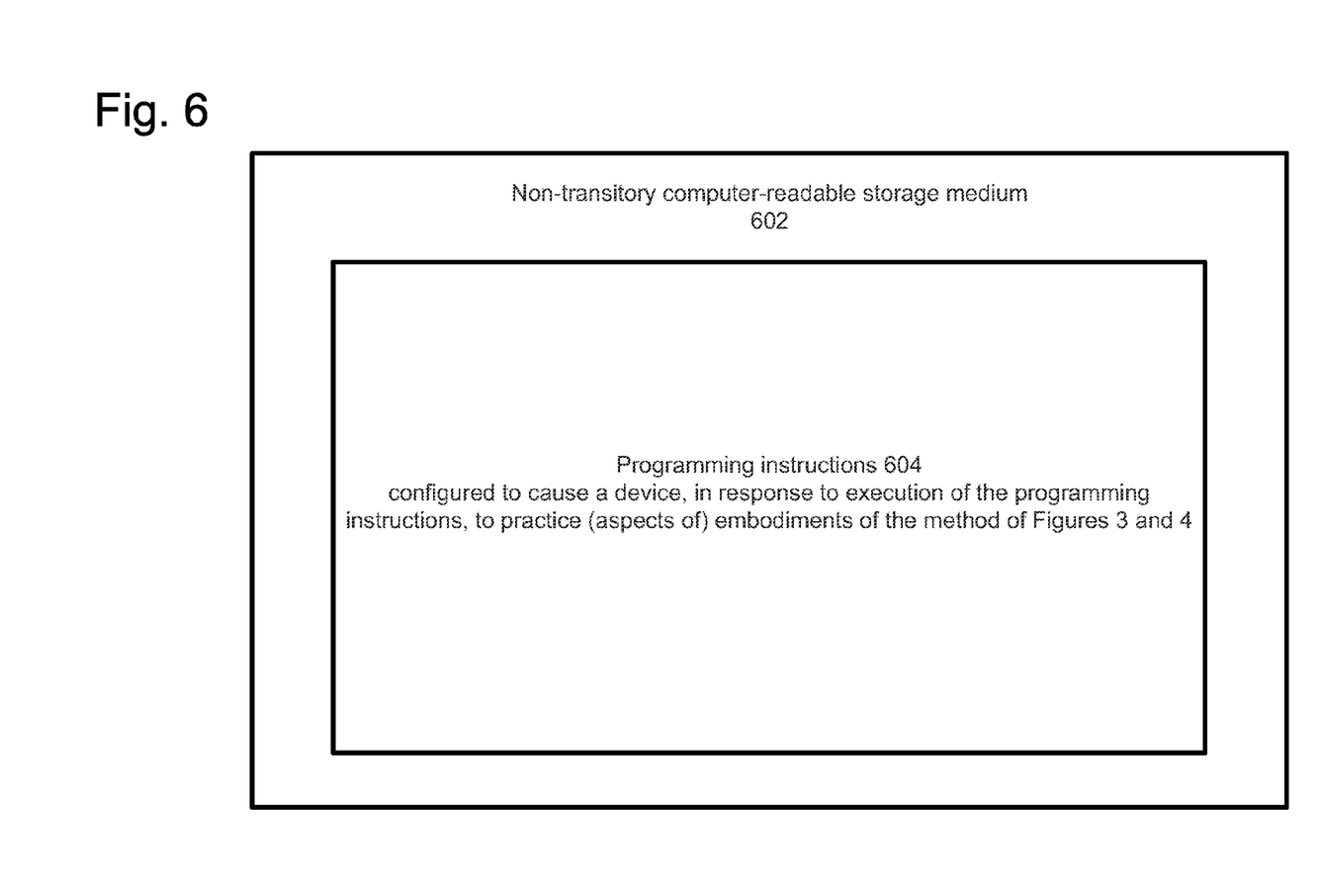
FIG. 6 illustrates an example storage medium with instructions configured to enable an apparatus to practice the present disclosure, in accordance with various embodiments.

FIG. 6 illustrates an example non-transitory computer-readable storage medium having instructions configured to practice all or selected ones of the operations associated with content aggregation/distribution servers 104 or content consumption devices 108, earlier described; in accordance with various embodiments. As illustrated, non-transitory computer-readable storage medium 602 may include a number of programming instructions 604. Programming instructions 604 may be configured to enable a device, e.g., computer 500, response to execution of the programming instructions, to perform, e.g., various operations of processes 300 and 400 of FIGS. 3 and 4, e.g., but not limited to, to the various operations performed to encode received content. In alternate embodiments, programming instructions 604 may be disposed on multiple non-transitory computer-readable storage media 602 instead.

Referring back to FIG. 5, for one embodiment, at least one of processors 502 may be packaged together with computational logic 522 configured to practice aspects of processes 300 and 400 of FIGS. 3 and 4. For one embodiment, at least one of processors 502 may be packaged together with computational logic 522 configured to practice aspects of processes 300 and 400 of FIGS. 3 and 4 to form a System in Package (SiP). For one embodiment, at least one of processors 502 may be integrated on the same die with computational logic 522 configured to practice aspects of processes 300 and 400 of FIGS. 3 and 4. For one embodiment, at least one of processors 502 may be packaged together with computational logic 522 configured to practice aspects of processes 300 and 400 of FIGS. 3 and 4 to form a System on Chip (SoC). For at least one embodiment, the SoC may be utilized in, e.g., but not limited to, a computing tablet.

The following paragraphs describe examples of various embodiments. In various embodiments, one or more computer-readable media may include instructions written thereon that, in response to execution on a computing device, cause the computing device to encode received video and/or audio data into a plurality of portions of encoded video and/or audio data. The encoding may include encode two or more portions of encoded video and/or audio data at least in part using different sets of one or more encoding control variable settings. The set of one or more encoding control variable settings used for a portion may be dependent on contents within the portion.

In various embodiments, encoding two or more portions may include encoding of a first portion of received video and/or audio data in accordance with at least two sets of one or more encoding control variable settings to respectively create at least two encoded instances of the first portion of received video and/or audio data. At least one of the encoding control variable settings of the at least two sets of one or more encoding control variables settings may be different. Encoding two or more portions may also include selection of one of the at least two encoded instances for subsequent provision for playing. Encoding two or more portions may also include repeating the encoding and selection for at least a second portion of received video and/or audio data using the same or another at least two sets of one or more encoding control variable settings.

In various embodiments, selection of one of the at least two encoded instances for subsequent provision may include selection, out of the at least two encoded instances, of an instance that has a bitrate lower than a pre-determined bitrate. In various embodiments, selection of an instance of the at least two encoded instances that has a bitrate lower than a pre-determined bitrate may include determination of quality metrics for the at least two encoded instances and selection of the instance that has a bitrate lower than the pre-determined bitrate based at least in part on the quality metrics. In various embodiments, selection of the instance that has a bitrate lower than the pre-determined bitrate based at least in part on the quality metrics may include selection of the instance that has the highest quality out of encoded instances that have bitrates lower than the pre-determined bitrate.

In various embodiments, determination of quality metrics for the at least two encoded instances comprises compare the at least two encoded instances to the first portion of received video and/or audio data to determine differences between the first portion of the received video and/or audio data and the at least two encoded instances.

In various embodiments, the second portion of received video and/or audio data may be encoded using the same at least two sets of one or more encoding control variable settings as the first portion of received video and/or audio data. In various embodiments, the two sets of one or more encoding control variable settings may include exactly two sets of one or more encoding control variable settings.

In various embodiments, control variable settings may include resolution settings. In various embodiments, control variable settings may include frame rate settings. In various embodiments, control variable settings may include compression settings.

In various embodiments, the two or more portions of encoded video and/or audio data may include portions of one or more segments of encoded video and/or audio data that are configured to be separately provisioned as a unit of encoded video and/or audio data to a content consumption device. Encoding two or more portions of encoded video and/or audio data may include encode two or more segments of encoded video and/or audio data. Encode two or more portions of encoded video and/or audio data may include encode two or more portions of a single segment of encoded video and/or audio data. In various embodiments, the instructions may be further configured to cause the computing device to provision the one or more encoded segments of video and/or audio data to the content consumption device.

In various embodiments, an apparatus for encoding video and/or audio data may include one or more computer processors and an encoder module configured to operate on the one or more computer processors to encode received video and/or audio data into a plurality of portions of encoded video and/or audio data encoding may include encoding of two or more portions of encoded video and/or audio data at least in part using different sets of one or more encoding control variable settings. Setting of one or more encoding control variable settings used for a portion may be dependent on contents within the portion.

In various embodiments, the encoder module may be configured to encode two or more portions through encoding of a first portion of received video and/or audio data in accordance with at least two sets of one or more encoding control variable settings to respectively create at least two encoded instances of the first portion of received video and/or audio data, wherein at least one of the encoding control variable settings of the at least two sets of one or more encoding control variables settings is different. The encoder module may also be configured to encode two or more portions through selection of one of the at least two encoded instances for subsequent provision for playing. The encoder module may also be configured to encode two or more portions through repeating of the encode and selection for at least a second portion of received video and/or audio data using the same or another at least two sets of one or more encoding control variable settings.

In various embodiments, selection of one of the at least two encoded instances for subsequent provision may include selection, out of the at least two encoded instances, of an instance that has a bitrate lower than a pre-determined bitrate. In various embodiments, selection of an instance of the at least two encoded instances that has a bitrate lower than a pre-determined bitrate may include determination of quality metrics for the at least two encoded instances and selection of the instance that has a bitrate lower than the pre-determined bitrate based at least in part on the quality metrics.

In various embodiments, selection of the instance that has a bitrate lower than the pre-determined bitrate based at least in part on the quality metrics may include selection of an instance that has a highest quality out of encoded instances that have bitrates lower than the pre-determined bitrate. In various embodiments, the encoder may be configured to perform determination of quality metrics for the at least two encoded instances through comparison of the at least two encoded instances to the first portion of received video and/or audio data to determine differences between the first portion of the received video and/or audio data and the at least two encoded instances.

In various embodiments, the second portion of received video and/or audio data may be encoded using the same at least two sets of one or more encoding control variable settings as the first portion of received video and/or audio data, in various embodiments, control variable settings may include resolution settings, frame rate settings, and/or compression settings.

In various embodiments, the apparatus may further include a storage coupled to the one or more computer processors. The two or more portions of encoded video and/or audio data may include portions of one or more segments of encoded video and/or audio data that are configured to be stored on the storage and separately provisioned as a unit of encoded video and/or audio data to a content consumption device. The encoder may be configured to encode two or more portions of encoded video and/or audio data through encoding of two or more segments of encoded video and/or audio data. The encoder may be configured to encode two or more portions of encoded video and/or audio data through encode of two or more portions out of a single segment of encoded video and/or audio data. The apparatus may further include a content provision module coupled to the storage and configured to provision the one or more encoded segments of video and/or audio data to the content consumption device.

Computer-readable media including non-transitory computer-readable media), methods, apparatuses, systems and devices for performing the above-described techniques are illustrative examples of embodiments disclosed herein. Additionally, other devices in the above-described interactions may be configured to perform various disclosed techniques.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. One or more non-transitory computer-readable media including instructions written thereon that, in response to execution by a computer device, cause the computer device to:
   encode a first portion of received video and/or audio data in accordance with at least two sets of a plurality of encoding control variable settings to respectively create at least two encoded instances of the first portion of received video and/or audio data such that individual instances of the at least two encoded instances have substantially similar bitrates and at least one of the encoding control variable settings of the at least two sets of the plurality of encoding control variable settings is different;
   determine, for each individual instance of the at least two encoded instances, a quality metric based on the at least two sets of the plurality of encoding control variable settings used to create the individual instance; and
   prior to receipt of a request for provision of the first portion for playing at a published bitrate, select, according to a predetermined provisioning criterion, an individual instance of the at least two encoded instances having a greatest determined quality metric as the published bitrate for provisioning in a stream, wherein the greatest determined quality metric is a quality metric that is closest to fulfilling the predetermined provisioning criterion than other determined quality metrics of other individual instances of the at least two encoded instances.

2. The non-transitory computer-readable media of claim 1, wherein the computer device, in response to execution of the instructions, is to:
   encode two or more portions of the received video and/or audio data through repetition of the encode and the select for at least a second portion of the received video and/or audio data using a same or another at least two sets of one or more encoding control variable settings.

3. The non-transitory computer-readable media of claim 2, wherein, to select one of the at least two encoded instances, the computer device, in response to execution of the instructions, is to:
   select, out of the at least two encoded instances, an instance that has a bitrate lower than the published bitrate.

4. The non-transitory computer-readable media of claim 3, wherein, to select the instance of the at least two encoded instances that has a bitrate lower than the published bitrate, the computer device, in response to execution of the instructions, is to:
   select the individual instance that has a bitrate lower than the published bitrate based at least in part on the quality metrics.

5. The non-transitory computer-readable media of claim 4, wherein, to select the individual instance that has a bitrate lower than the published bitrate based at least in part on the quality metrics, the computer device, in response to execution of the instructions, is to:
   select the individual instance that has a highest quality out of encoded instances that have bitrates lower than the published bitrate when the predetermined provisioning criterion indicates to select a highest quality instance from among the individual instances, and
   select the individual instance that has a lowest quality out of encoded instances that have bitrates lower than the published bitrate when the predetermined provisioning criterion indicates to select an individual instance of the individual instances for bitrate savings.

6. The non-transitory computer-readable media of claim 4, wherein to determine quality metrics for the at least two encoded instances, the computer device, in response to execution of the instructions, is to:
compare the at least two encoded instances to the first portion of received video and/or audio data to determine differences between the first portion of the received video and/or audio data and the at least two encoded instances.

7. The non-transitory computer-readable media of claim 2, wherein the second portion of received video and/or audio data is encoded using the same at least two sets of one or more encoding control variable settings as the first portion of received video and/or audio data.

8. The non-transitory computer-readable media of claim 2, wherein the two sets of one or more encoding control variable settings comprises exactly two sets of one or more encoding control variable settings.

9. The non-transitory computer-readable media of claim 1, wherein control variable settings comprise resolution settings.

10. The non-transitory computer-readable media of claim 1, wherein control variable settings comprise frame rate settings.

11. The non-transitory computer-readable media of claim 1, wherein control variable settings comprise compression settings.

12. The non-transitory computer-readable media of claim 2, wherein the two or more portions of encoded video and/or audio data comprise portions of one or more segments of encoded video and/or audio data that are configured to be separately provisioned as a unit of encoded video and/or audio data to a content consumption device.

13. The non-transitory computer-readable media of claim 12, wherein, to encode the two or more portions, the computer device, in response to execution of the instructions, is to encode two or more segments of encoded video and/or audio data.

14. The non-transitory computer-readable media of claim 12, wherein, to encode the two or more portions, the computer device, in response to execution of the instructions, is to encode two or more portions of a single segment of encoded video and/or audio data.

15. The non-transitory computer-readable media of claim 12, wherein the instructions are further to cause the computer device to provision the one or more encoded segments of video and/or audio data to the content consumption device.

16. An apparatus for encoding video and/or audio data, comprising:
one or more computer processors;
an encoder to operate on the one or more computer processors to:
encode a first portion of received video and/or audio data in accordance with at least two sets of a plurality of encoding control variable settings to respectively create at least two encoded instances of the first portion of received video and/or audio data such that individual instances of the at least two encoded instances have substantially similar bitrates and at least one of the encoding control variable settings of the at least two sets of the plurality of encoding control variable settings is different;
determine, for each individual instance of the at least two encoded instances, a quality metric based on the at least two sets of the plurality of encoding control variable settings used to create the individual instance; and
prior to receipt of a request for provision of the first portion for playing at a published bitrate, select, according to a predetermined provisioning criterion, an individual instance of the at least two encoded instances having a greatest determined quality metric to be the published bitrate for provisioning in a stream, wherein the greatest determined quality metric is a quality metric that is closest to fulfilling the predetermined provisioning criterion than other determined quality metrics of other individual instances of the at least two encoded instances.

17. The apparatus of claim 16, wherein the encoder is further to:
encode two or more portions through repetition of the encode and the selection for at least a second portion of the received video and/or audio data using a same or another at least two sets of one or more encoding control variable settings.

18. The apparatus of claim 17, wherein, to select one of the at least two encoded instances, the encoder is to:
select, out of the at least two encoded instances, an instance that has a bitrate lower than the published bitrate.

19. The apparatus of claim 18, wherein to select an instance of the at least two encoded instances that has a bitrate lower than the published bitrate, the encoder is to:
select the individual instance that has a bitrate lower than the published bitrate based at least in part on the quality metrics.

20. The apparatus of claim 19, wherein, to select an instance of the at least two encoded instances that has a bitrate lower than the published bitrate, the encoder is to:
select an individual instance that has a highest quality out of encoded instances that have bitrates lower than the published bitrate when the predetermined provisioning criterion indicates to select a highest quality instance from among the individual instances, and
select the individual instance that has a lowest quality out of encoded instances that have bitrates lower than the published bitrate when the predetermined provisioning criterion indicates to select an individual instance of the individual instances for bitrate savings.

21. The apparatus of claim 19, wherein the encoder is to determine quality metrics for the at least two encoded instances through comparison of the at least two encoded instances to the first portion of received video and/or audio data to determine differences between the first portion of the received video and/or audio data and the at least two encoded instances.

22. The apparatus of claim 17, wherein the second portion of received video and/or audio data is encoded using the same at least two sets of one or more encoding control variable settings as the first portion of received video and/or audio data.

23. The apparatus of claim 16, wherein control variable settings comprise resolution settings, frame rate settings, and/or compression settings.

24. The apparatus of claim 17, further comprising:
a storage coupled to the one or more computer processors and wherein the two or more portions of encoded video and/or audio data comprise portions of one or more segments of encoded video and/or audio data that are to be stored on the storage and separately provisioned as a unit of encoded video and/or audio data to a content consumption device.

25. The apparatus of claim 24, wherein the encoder is to encode the two or more portions through encoding of the two or more segments of encoded video and/or audio data.

26. The apparatus of claim 24, wherein the encoder is to encode the two or more portions through encoding of the two or more portions out of a single segment of encoded video and/or audio data.

27. The apparatus of claim 24, further comprising a content provision coupled to the storage and to provision the one or more encoded segments of video and/or audio data to the content consumption device.

28. A computer-implemented method for encoding video and/or audio data, comprising:
    encoding, by a computer device, a first portion of received video and/or audio data in accordance with at least two sets of a plurality of encoding control variable settings to respectively create at least two encoded instances of the first portion of received video and/or audio data such that individual instances of the at least two encoded instances have substantially similar bitrates and at least one of the encoding control variable settings of the at least two sets of the plurality of encoding control variable settings is different;
    determining, by the computer device for each individual instance of the at least two encoded instances, a quality metric based on the at least two sets of the plurality of encoding control variable settings used to create the individual instance; and
    prior to receiving a request for provision of the first portion for playing at a published bitrate, selecting, by the computer device according to a predetermined provisioning criterion, an individual instance of the at least two encoded instances having a greatest determined quality metric as the published bitrate for provisioning in a stream, wherein the greatest determined quality metric is a quality metric that is closest to fulfilling the predetermined provisioning criterion than other determined quality metrics of other individual instances of the at least two encoded instances.

29. The method of claim 28, wherein the encoding further comprises:
    encoding by the computer device, two or more portions of the received video and/or audio data by repeating, by the computer device, the encoding and selecting for at least a second portion of received video and/or audio data using a same or another at least two sets of one or more encoding control variable settings.

30. The method of claim 29, wherein selecting one of the at least two encoded instances comprises:
    selecting, by the computer device, an instance that has a bitrate lower than a published bitrate out of the at least two encoded instances.

31. The method of claim 30, wherein selecting an instance of the at least two encoded instances that has a bitrate lower than a published bitrate comprises:
    selecting, by the computer device, the individual instance that has a bitrate lower than the published bitrate based at least in part on the quality metrics.

32. The method of claim 31, wherein selecting the individual instance that has a bitrate lower than the published bitrate based at least in part on the quality metrics comprises:
    selecting, by the computer device, an individual instance that has a highest quality out of encoded instances that have bitrates lower than the published bitrate when the predetermined provisioning criterion indicates to select a highest quality instance from among the individual instances, and
    selecting, by the computer device, an individual instance that has a lowest quality out of encoded instances that have bitrates lower than the published bitrate when the predetermined provisioning criterion indicates to select an individual instance of the individual instances for bitrate savings.

33. The method of claim 31, wherein determining quality metrics for the at least two encoded instances comprises comparing, by the computer device, the at least two encoded instances to the first portion of received video and/or audio data to determine differences between the first portion of the received video and/or audio data and the at least two encoded instances.

34. The method of claim 29, wherein the second portion of received video and/or audio data is encoded using the same at least two sets of one or more encoding control variable settings as the first portion of received video and/or audio data.

35. The method of claim 28, wherein control variable settings comprise resolution settings, frame rate settings, and/or compression settings.

36. The method of claim 29, wherein the two or more portions of encoded video and/or audio data comprise portions of one or more segments of encoded video and/or audio data that are configured to be stored and separately provisioned as a unit of encoded video and/or audio data to a content consumption device.

37. The method of claim 36, wherein encoding the two or more portions comprises encoding two or more segments of encoded video and/or audio data.

38. The method of claim 36, wherein encoding the two or more portions comprises encoding two or more portions of a single segment of encoded video and/or audio data.

39. The method of claim 36, further comprising provisioning, by the computer device, the one or more encoded segments of video and/or audio data to the content consumption device.

* * * * *